(12) United States Patent
Goland

(10) Patent No.: US 7,500,104 B2
(45) Date of Patent: Mar. 3, 2009

(54) NETWORKED DEVICE BRANDING FOR SECURE INTERACTION IN TRUST WEBS ON OPEN NETWORKS

(75) Inventor: Yaron Goland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 693 days.

(21) Appl. No.: 09/882,491

(22) Filed: Jun. 15, 2001
(Under 37 CFR 1.47)

(65) Prior Publication Data
US 2003/0056114 A1 Mar. 20, 2003

(51) Int. Cl.
*H04L 9/12* (2006.01)

(52) U.S. Cl. .................. 713/175; 713/156; 713/168; 726/2; 726/3; 726/4; 726/5

(58) Field of Classification Search ............. 713/151, 713/171, 168, 170, 156, 175; 726/27, 2–5, 726/10; 380/277–278
See application file for complete search history.

(56) References Cited

U.S. PATENT DOCUMENTS

| | | | |
|---|---|---|---|
| 4,972,472 A | | 11/1990 | Brown et al. |
| 5,016,277 A | | 5/1991 | Hamilton |
| 5,109,483 A | * | 4/1992 | Baratz et al. ............... 709/227 |
| 5,146,497 A | | 9/1992 | Bright |
| 5,208,859 A | | 5/1993 | Bartucci et al. |
| 5,301,232 A | | 4/1994 | Mulford |
| 5,315,657 A | * | 5/1994 | Abadi et al. ................ 726/4 |
| 5,325,432 A | | 6/1994 | Gardeck et al. |
| 5,381,479 A | | 1/1995 | Gardeck et al. |
| 5,381,480 A | | 1/1995 | Butter et al. |
| 5,398,932 A | | 3/1995 | Eberhardt et al. |
| 5,471,532 A | | 11/1995 | Gardeck et al. |
| 5,748,736 A | * | 5/1998 | Mittra ........................ 713/163 |
| 5,812,671 A | | 9/1998 | Ross, Jr. |
| 5,887,251 A | | 3/1999 | Fehnel |
| 5,995,624 A | * | 11/1999 | Fielder et al. ............... 713/169 |
| 6,049,878 A | * | 4/2000 | Caronni et al. ............... 726/3 |
| 6,069,957 A | | 5/2000 | Richards |

(Continued)

FOREIGN PATENT DOCUMENTS

WO     WO 96/42154 A1     12/1996

OTHER PUBLICATIONS

Kohl, J., et al., *The Kerberos Network Authentication Service* (V5), RFC 1510, The Internet Engineering Task Force, 152 pages (Sep. 1993).

(Continued)

*Primary Examiner*—Kambiz Zand
*Assistant Examiner*—Yin-Chen Shaw
(74) *Attorney, Agent, or Firm*—Klarquist Sparkman, LLP

(57) ABSTRACT

A branding process provides a networked computing device with initial set up information, including a name, a public/private key pair, and a set of certificates the device will need to inter-operate with other devices in the trust group. A branding device conveys the initial set-up information to the networked computing device via a limited access network interface, or alternatively via a broadcast network media with the device enclosed in a wave guide and/or Faraday cage. The networked computing device can then use the set up information to verify that other devices on the network that seek to interact with the device are also members of the trust group, with which networked computing device can interact.

19 Claims, 5 Drawing Sheets

U.S. PATENT DOCUMENTS

| | | | |
|---|---|---|---|
| 6,101,255 A * | 8/2000 | Harrison et al. | 380/52 |
| 6,263,435 B1 * | 7/2001 | Dondeti et al. | 713/163 |
| 6,263,506 B1 | 7/2001 | Ezaki et al. | |
| 6,266,420 B1 * | 7/2001 | Langford et al. | 380/282 |
| 6,353,886 B1 * | 3/2002 | Howard et al. | 713/156 |
| 6,463,585 B1 | 10/2002 | Hendricks et al. | |
| 6,584,566 B1 | 6/2003 | Hardjono | |
| 6,587,873 B1 | 7/2003 | Nobakht et al. | |
| 6,633,979 B1 * | 10/2003 | Smeets | 713/151 |
| 6,754,829 B1 * | 6/2004 | Butt et al. | 713/200 |
| 6,772,331 B1 * | 8/2004 | Hind et al. | 713/151 |
| 6,801,998 B1 * | 10/2004 | Hanna et al. | 713/155 |
| 6,915,434 B1 | 7/2005 | Kuroda et al. | |
| 7,065,579 B2 * | 6/2006 | Traversat et al. | 709/230 |
| 2002/0004903 A1 | 1/2002 | Kamperman et al. | |
| 2002/0018571 A1 | 2/2002 | Anderson et al. | |
| 2002/0099668 A1 * | 7/2002 | Perlman | 705/76 |
| 2002/0129247 A1 * | 9/2002 | Jablon | 713/169 |

OTHER PUBLICATIONS

Doraswamy, N., et al., *IPSec—The New Security Standard for the Internet, Intranets, and Virtual Private Networks*, Prentice-Hall, Inc., Chapter 4, "IPSec Architecture," pp. 57-79 (1999).

Doraswamy, N., et a., *IPSec—The New Security Standard for the Internet, Intranets, and Virtual Private Networks*, Prentice-Hall, Inc., Chapter 7, "The Internet Key Exchange (IKE)," pp. 99-128 (1999).

Steiner, J., et al., *Kerberos:An Authentication Service for Open Network Systems*, pp. 1-15 (Undated).

Kent, S., et al., *Security Architecture for the Internet Protocol*, RFC 2401, The Internet Engineering Task Force, pp. 1-49, (Copyright © The Internet Society, 1998).

Harkins, D., et al., *The Internet Key Exchange (IKE)*, RFC 2409, The Internet Engineering Task Force, pp. 1-31 (Copyright © The Internet Society, 1998).

Harney, H., et al., *Group Key Management Protocol (GKMP) Specification*, RFC 2093, The Internet Engineering Task Force, pp. 1-19 (Jul. 1997).

Harney, H., et al., *Group Key Management Protocol (GKMP) Architecture*, RFC 2094, The Internet Engineering Task Force, pp. 1-17 (Jul. 1997).

Williams, A., *Securing Zeroconf Networks*, Internet-Draft, The Internet Engineering Task Force Zeroconf Group, pp. 1-14 (Nov. 2000).

Blundo, Carlo et al. Perfectly Secure Key Distribution for Dynamic Conferences. Inf. Comput. 146(1): 1-23 (1998).

Canetti, Ran et al. "SMuG.0", Aug. 1998 (co-located at IETF 42).

Eschenauer, Laurent et al. A key-management scheme for distributed sensor networks. ACM Conference on Computer and Communications Security 2002: 41-47.

Ghanem, Sahar M. et al. A Simple XOR-Based Technique for Distributing Group Key in Secure Multicasting, ISCC 2000: 166-171.

Li, Xiaozhou Steve et al. Batch rekeying for secure group communications. WWW 2001: 525-534.

Menezes, Alfred J. et al. Handbook of Applied Cryptography, 1997 CRC Press, pp. 551-581 (1997).

Perrig, Adrian et al. ELK, A New Protocol for Efficient Large-Group Key Distribution. IEEE Symposium on Security and Privacy, pp. 247-262 (2001).

Sato, Fumiaki et al. A Push-Based Key Distribution and Rekeying Protocol for Secure Multicasting. ICPADS 2001: 214-219.

Steiner, Michael et al. Key Agreement in Dynamic Peer Groups. IEEE Trans. Parallel Distrib. Syst. 11(8): 769-780 (2000).

Symantec Corporation. "Norton AntiVirus Corporate Edition Implementation Guide", 1999-2000, pp. 181-214.

Tanaka, Shin-ya et al. A Key Distribution and Rekeying Framework with Totally Ordered Multicast Protocols, IEEE, pp. 831-838 (2001).

Yang et al., "Reliable Group Rekeying: A Performance Analysis", *ACM*, pp. 27-38 (Aug. 2001).

Zhang et al., "Group Rekeying for Filtering False Data in Sensor Networks: A Predistribution and Local Collaboration-Based Approach," (2004).

Zhu et al., "GKMPAN: An Efficient Group Rekeying Scheme for Secure Multicast in Ad-Hoc Networks", *Proceedings of the First Annual Conference on Mobile and Ubiquitous Systems: Networking and Services*, IEEE, pp. 42-51, (2004).

Ballardie, "Scalable Multicase Key Distribution," RFC 1949, http://rfc1949.x42.com, May 1996, 17 pages.

Blaze et al., "Atomic Proxy Cryptography," Feb. 1998, AT&T, 10 pages.

Dondeti et al., "A Distributed Group Key Management Scheme for Secure Many-to-many Communication," 1999, 9 pages.

Harney et al., "Group Key Management Protocol (GKMP) Architecture," RFC 2094, http://rfc2094.x42.com, Jul. 1997, 21 pages.

Lee et al., "Distributed Collaborative Key Agreement Protocols for Dynamic Peer Groups," 2002, 10 pages.

Menezes et al., "Handbook of Applied Cryptography," CRC Press, 1997, pp. 546-555.

Mittra, "Iolus: A Framework for Scalable Secure Multicasting," ACM, 1997, pp. 1-12.

Tseung et al., "Guaranteed, Reliable, Secure Broadcast Networks," IEEE, 1990, pp. 576-583.

Wallner et al., "Key Management for Multicase: Issues and Architectures," http://rfc2627.x42.com, Jul. 1999, 22 pages.

\* cited by examiner

NETWORKED DEVICE BRANDING FOR SECURE INTERACTION IN TRUST WEBS ON OPEN NETWORKS

TECHNICAL FIELD

This invention relates to set up of authentication and security to establish interaction among a sub-group of devices on an otherwise non-secure, multi-user access network.

BACKGROUND AND SUMMARY

The cost of computing and networking technologies have fallen to the point where computing and networking capabilities can be built into the design of many electronic devices in the home, the office and public places. The combination of inexpensive and reliable shared networking media with a new class of small computing devices has created an opportunity for new functionality based mainly on the connectivity among these devices. This connectivity can be used to remotely control devices, to move digital data in the form of audio, video and still images between devices, to share information among devices and with the unconstrained World Wide Web of the Internet and to exchange structured and secure digital data to support things like electronic commerce. A prevalent feature of these connectivity scenarios is to provide remote access and control of connected devices and services from another device with user interface capabilities (e.g., a universal remote controller, handheld computer or digital assistant, cell phones, and the like). The connectivity also enables many new applications for computing devices, such as proximity-based usage scenarios where devices interact based at least in part on geographical or other notions of proximity. This trend of ubiquitous and pervasive networked computing leads toward a world in which all types of devices are able to effortlessly and seamlessly interconnect and interact.

Common networking media (e.g., the Internet, Ethernet Local Area Network (LAN), wireless network, and the like) have a drawback in that they provide open, multiple user access to any device with an appropriate network adapter, or other physical connection to the networking medium. However, in many common situations, it is desirable to control which other devices and/or users can interact with a networked device. On a wireless network in a home environment, for example, the home owner may want to establish that various of the home owner's networked devices can interact (e.g., a networked telephone terminal with email display can interact with a home email server, or a music compact disk player can interact with a set of audio system amplifiers and speakers on the wireless home network), while at the same time preventing interaction with other devices that may access the network (e.g., a neighbor's devices within range of the wireless network). On an office LAN network, interaction with networked conference room devices (e.g., monitors, audio system, electronic white board, etc.) may be desirably limited to other devices owned by the business, and exclude outsider's devices that may gain access to the network (e.g., by being within wireless networking range, plugged into an Ethernet wall plate connector, or via an Internet connection to the office LAN network).

Cryptographic techniques can be used to protect confidentiality of communications between devices (e.g., via cryptographic encryption of data), protect message integrity (e.g., via a cryptographic checksum), authenticate sender identity (e.g., via a digital signature), and verify information presented by the sender is certified by a trusted authority (e.g., via digital certificates). Cryptographic encryption techniques can be based on well known symmetric key and public key encryption algorithms, such as the National Bureau of Standards' Data Encryption Standard (DES), Triple DES, the National Institute of Standards and Technology's (NIST) Advanced Encryption Algorithm (AES), the Diffie-Hellman-Merkle Algorithm, the RSA Algorithm, and the ElGamal Algorithm. Cryptographic checksum techniques can use well known message-digest algorithms, such as MD2, MD4, MD5, SHA and SHA-5. Digital signatures can use the well known NIST Digital Signature Standard (DSS), and the Digital Signature Algorithm (DSA). A well known digital certificate technique includes the X.509 digital certificate standard of the International Telecommunication Union-Telecommunication Standardization Sector (ITU-T) and ISO/International Electrotechnical Commission (IEC).

An obstacle to use of these cryptographic techniques to provide secure interaction within trust groups of devices on an open network is the difficulty in set-up or configuration of the devices with the necessary authentication, and identification information (e.g., cryptographic keys, identification certificates, user and/or group identity, password, etc.). This obstacle is a particularly significant impediment to establishing trust groups of devices on unmanaged networks, such as in the home or small business environments, where professional network administration is not available. With a trend towards pervasive networked computing, such unmanaged networks may predominate. For example, device manufacturers cannot expect the average non-technically savvy consumers to be willing or capable of setting up their now-pervasively-networked home appliances to establish trust group interaction among such devices.

The present invention is directed towards providing a way to easily setup devices on openly accessible network media to establish "trust webs" or sub-group of devices on the network media authorized to interact with each other. Using cryptographic techniques, the devices in a trust web distinguish which other devices on the openly accessible network media are authorized to access it, and communicate with such other devices. In an embodiment illustrated herein, a process (herein referred to as "branding") electronically imprints a device with its initial trust group set up information to properly interact in a trust web with other members of the network. In one illustrated implementation, this information includes a name, a public key, a private key and a set of certificates the device will need to inter-operate with other trust group devices that form the trust web.

According to one aspect of the invention, the initial branding of an uninitialized device is performed using a branding device. Using digital certificates or other cryptographic techniques, the branding device electronically imprints the device with its identity and membership in the trust group. In one exemplary implementation, the device is imprinted with a name for the device, the branding device's public key, and digital certificates to specify that the device trusts the branding device, and is a member of a trust group. The device can then use the branding device's public key to verify certificates of other devices on the network that seek to interact with the device are also members of the trust group. The now branded device then willingly interacts with such other devices in the trust group.

According to another aspect of the invention, the uninitialized device accepts its initial branding by the branding device only via a limited access network interface, such as an universal serial bus (USB), infrared or other like network media interface that provides non-broadcast or limited broadcast, one-to-one communication. Further, the uninitialized device preferably refuses interaction over the open access network until branded by a branding device via its limited access network interface. These measures are intended to prevent unknown others from branding the uninitialized device on an unsecured network before the owner has the opportunity to perform its initial branding, or like other unauthorized access.

Alternatively, the branding also can be performed in a secure manner via a wireless or other multi-access broadcast network medium interface of the uninitialized device by placing the branding and/or uninitialized devices in a wave-guide and/or Faraday cage that physically limits the transmission to the branding and uninitialized devices.

Additional features and advantages will be made apparent from the following detailed description of the illustrated embodiment which proceeds with reference to the accompanying drawings.

DETAILED DESCRIPTION

Figure 1:
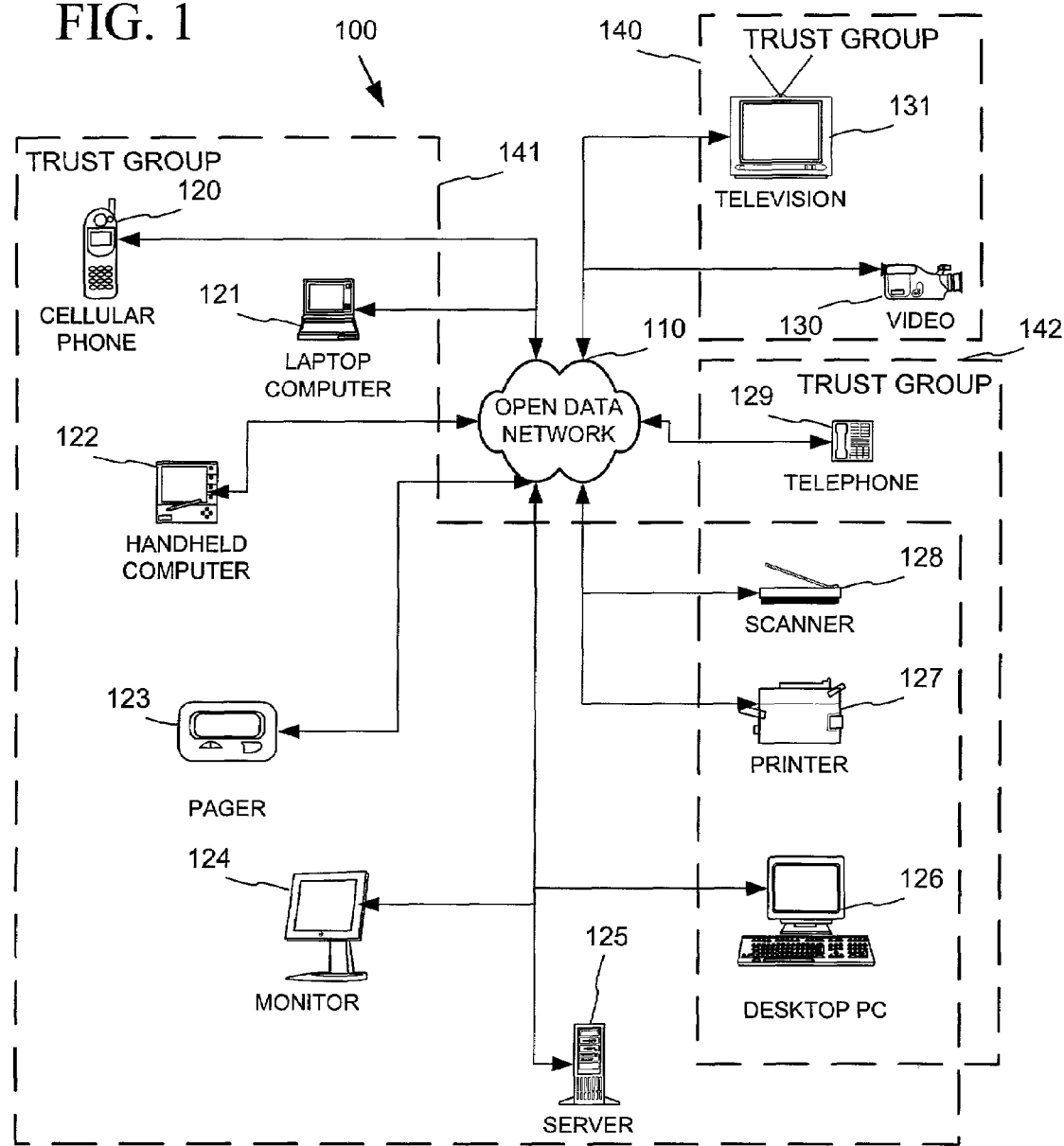
FIG. 1 is a network diagram depicting a pervasive networked computing environment where groups of networked computing devices are branded in accordance with an embodiment of the present invention to interact in trust groups.

With reference to FIG. 1, an implementation of the present invention provides branding of networked computing devices 120-131 to establish trust groups 140-142 in which the devices can securely interact when networked via an open access data network 110. FIG. 1 depicts an illustrative pervasive networked computing environment 100 where a large variety of everyday devices are equipped with networking and computing capability (e.g., the networked computing devices 120-131) to communicate via the open data network 110. The depicted networked computing devices 120-131 (including a cell phone, laptop computer, handheld computer, pager, monitor, server computer, desktop computer, printer, scanner, telephone, video camera, and television) are exemplary of the wide variety of networked computing devices that can support branding. The open data network 110 also can encompass any of a variety of networking media and networking technologies that permit multi-access, broadcast data communications among any devices with physical access to the network (e.g., via an appropriate network adapter in the area of the network), including power line networking, radio frequency networking, Ethernet, Cable Modem networks, satellite data networks, among others.

Branding is the process of providing a networked computing device with its initial trust set-up information to enable interaction with other members (e.g., devices 120-131) of a trust group 140-142 on the open data network 110. In the illustrated branding process, the trust set-up information includes the networked computing device's name, its public/private key identity and any certificates to properly interact with other devices in a trust group. Branding is necessary in order to allow a group of networked computing devices (e.g., devices 120-128 in trust group 141; devices 126-129 in trust group 142; and devices 130-131 in trust group 140) to operate securely over an unsecured multi-access network medium of the open data network 110.

In one implementation, the branding process uses an authentication, and trust transfer technology based on public key cryptography called Assertion Based Certificates, which is detailed in an Appendix A section below. Alternative implementations of branding can use other well known public-key cryptography and digital certificate techniques, such as the well known Diffie-Hellman, RSA, and ElGamal public key cryptography algorithms and the X.509 digital certificate standard, to encode and imprint trust group devices with their device name, cryptography keys, branding device and group membership certificates information for establishing the trust web. Well known digital certificate systems, such as the Microsoft Certificate Server, can be modified to perform the branding process as described herein.

Figure 2:
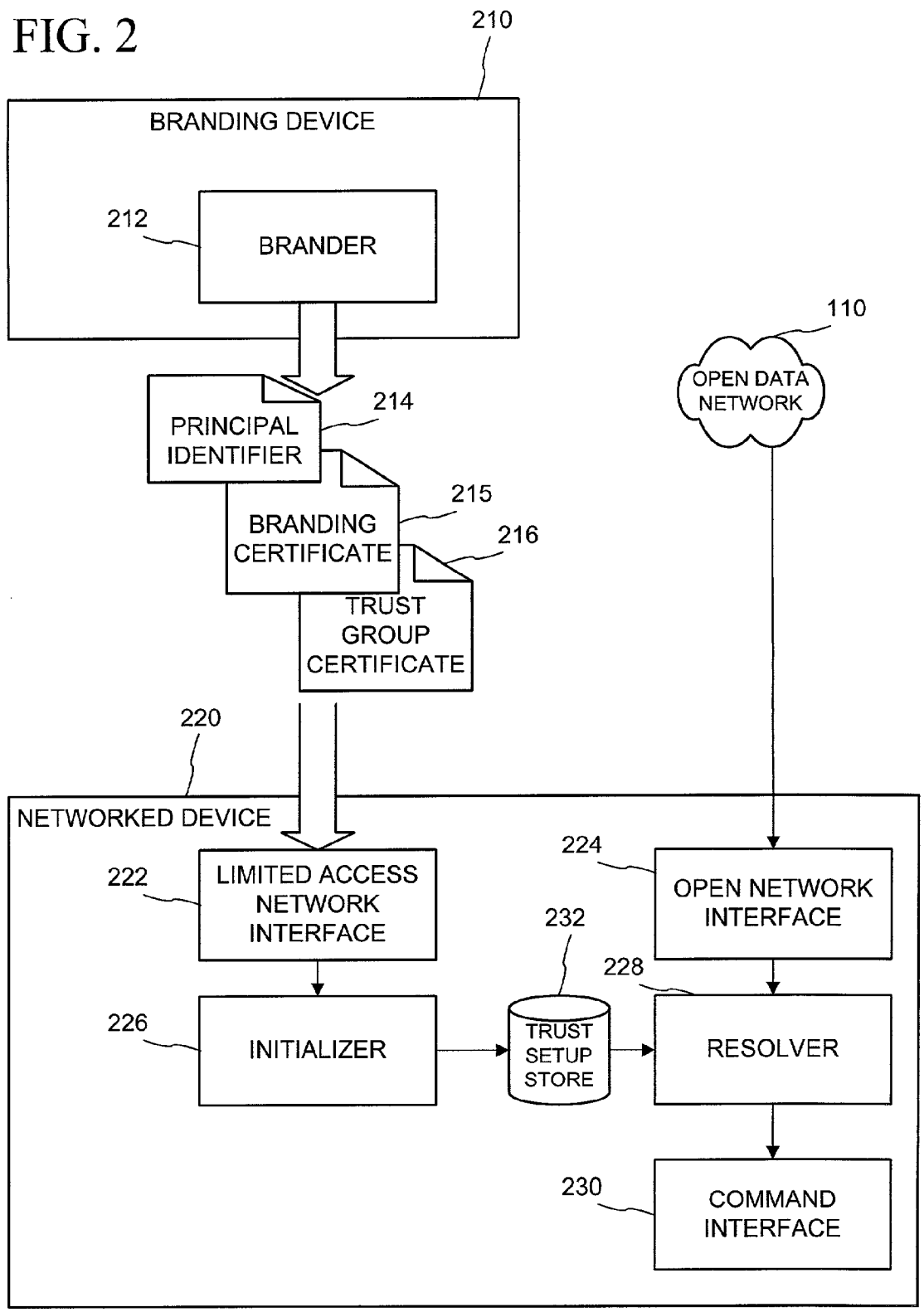
FIG. 2 is a data flow block diagram illustrating branding of a networked computing device, such as in the pervasive networked computing environment of FIG. 1, by a branding device via a limited access network interface.

With reference now to FIG. 2, a "security-enabled" networked computing device 220 includes support (e.g., in its operating software or firmware) to be branded via the branding process with its initial trust set-up information, and thereafter limit at least some of its interaction to only other members of a trust group or groups. When sold at retail (i.e., "out-of-box"), the device 220 initially is unbranded, meaning that it has not yet been initialized with trust set-up information. The branding process can then be performed by the end consumer or as a preparatory service by the retailer or an installation technician. The device 220 also can be reset to its initial unbranded state, such as via a reset button on the device or when serviced by a factory or other authorized technician.

In some implementations, the security-enabled networked computing device 220 can support being branded over any network media (including its open network interface 224 to the open data network 110). However, it is generally unwise to brand over a multi-access medium (the open data network 110) such as power line networking, radio frequency networking or even an improperly configured Ethernet or Cable Modem network. If a device permits branding via its open network interface and is connected to such an unsecured network, it is possible for someone else to come along and brand the device before the owner has an opportunity. Accordingly, a preferred implementation of the device 220 includes a limited access network interface 222, and is configured to permit branding only via the limited access network interface 222. The security enabled device 220 will refuse to accept commands over its open data network interface 224, until it has been branded through its limited access network interface 222, such as infrared or universal serial bus (USB). While infrared is a multi-access network medium it suffers from severe physical limitations making it a relatively secure medium for branding. In most consumer scenarios any level of security which requires physical access to violate security is usually acceptable. For those times when the device has to be branded in an unsecured physical location, USB or other direct link technologies can be used for branding.

In the illustrated branding implementation, the trust set-up information is conveyed to the security-enabled networked computing device 220 by a branding device 210. Common branding devices are expected to include handheld, laptop and desktop computers, but a variety of alternative devices including specific-purpose branding devices also can be used.

The illustrated branding device 210 is programmed with "brander" software 212 that implements branding of networked computing devices with their trust set-up information.

Figure 3:
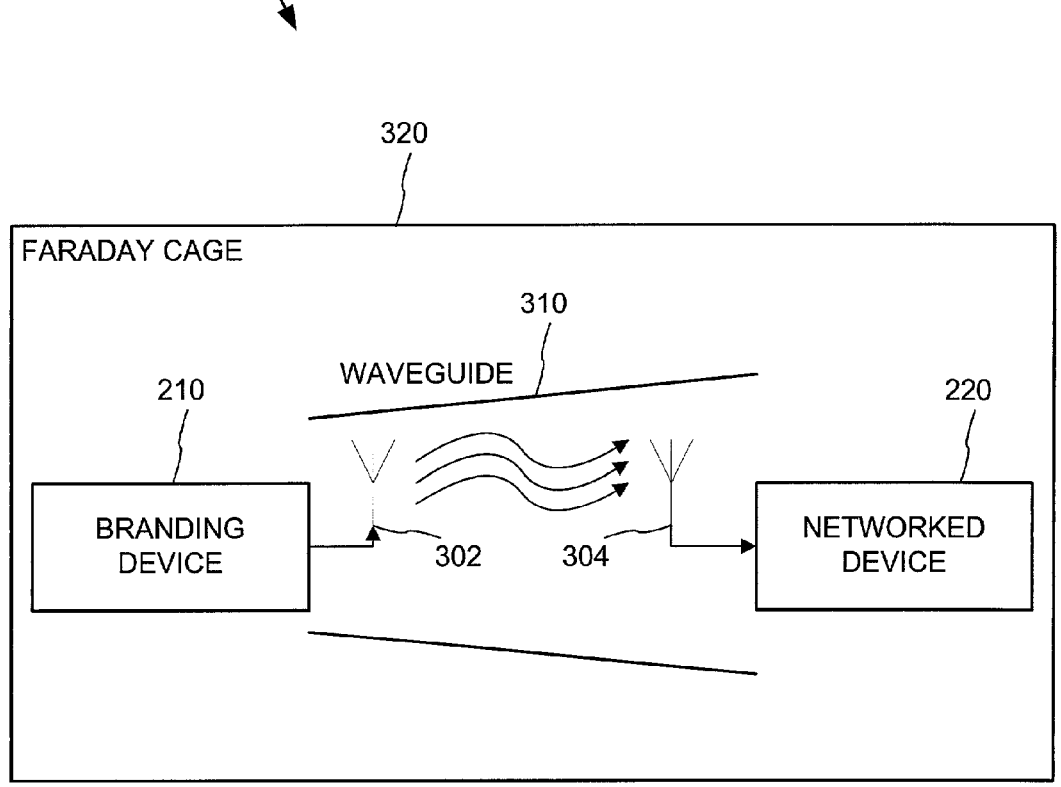
FIG. 3 is a block diagram of a branding device branding a networked computing device via a broadcast network media with access limited via a wave guide and/or Faraday cage.

With reference to FIG. 3, alternative branding implementations can establish a "trusted link" between the branding device 210 and the networked computing device 220 using broadcast network media (e.g., Bluetooth radio frequency (RF) networking or other wireless networking) which is limited using additional equipment (e.g., a wave guide 310 and/or Faraday cage 320) to provide one-to-one communication between the devices. In this way, the additional expense of equipping the networked computing device with a limited access network interface (e.g., a USB or infrared port) that is only needed for branding can be avoided. Instead, the networked computing device is configured to support a branding mode. When set to its branding mode, the networked computing device accepts branding via its open network interface 224. Preferably, there is a delay after activation of the branding mode before the branding mode is enabled to permit time for the networked computing device to be placed in the wave guide and/or Faraday cage.

For example, a Bluetooth-enabled cell phone can be branded using its bluetooth networking interface. The cell phone is set to its branding mode. The Bluetooth transmitter/receivers 300, 302 of the branding device 210 and networked computing device 220 are placed in the sleeve of the waveguide 310. The wave guide encloses the transmitted signal to remain inside the wave guide. As there is a small chance of "blow back" with a wave guide (i.e., signal escaping the wave guide), the networked computing device can further be placed in the Faraday cage. The Faraday cage is an enclosed area constructed to prevent entry or exit of electromagnetic radiation. The branding device then brands the cell phone. Branding using this alternative procedure can be performed for example at the retail outlet, a service center, or by an authorized installer or service technician.

Figure 4:
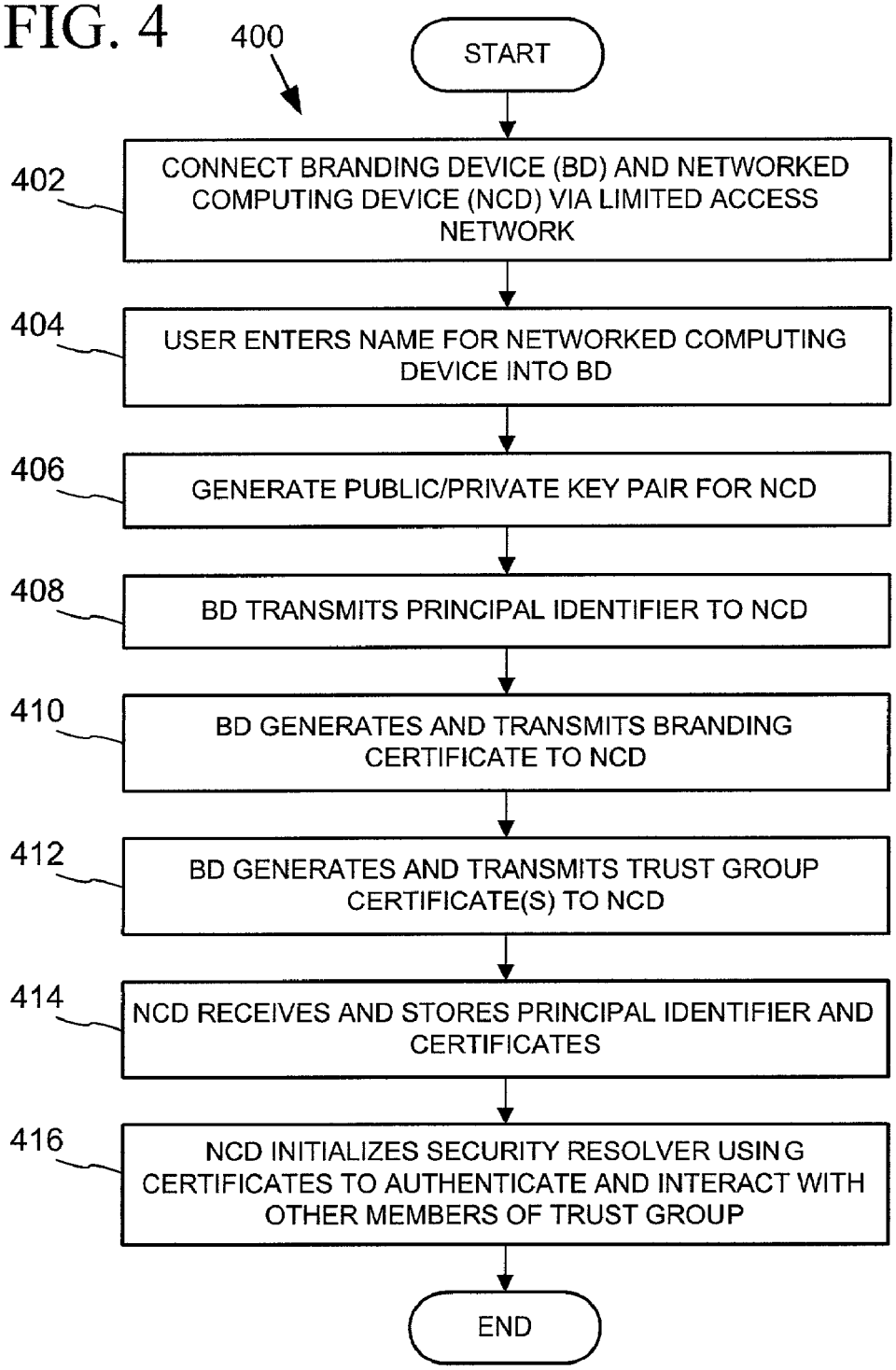
FIG. 4 is a flow diagram of a branding process performed by the branding device of FIG. 2 to establish trust group interaction between networked computing devices, such as in the pervasive networked computing environment of FIG. 1.

FIG. 4 illustrates a branding process 400 in which the branding device 210 provides the networked computing device 220 with its initial trust set-up information. Once the user has connected the branding device to the device to be branded using the limited access network port (as indicated at 402), the user will activate the brander program and enter (at 404) in a name for the networked computing device 220. For example, a CD player in the Kitchen might be named "Kitchen CD." Naming generally is useful in order to differentiate devices that perform the same function. One can imagine the confusion of setting up a stereo system if there are multiple CD players and speakers in the household. The branding process allows a name to be associated with each device so as to allow humans to differentiate them.

In addition to assigning a name of the networked computing device, a public/private key pair also is generated (at 406) to identify the device 220. For simple networked computing devices, the branding device 210 generates the public/private key pair. The name and public/private key pair of the networked computing device form a principal identifier 214 (FIG. 2) that represents the identity of the networked computing device. At 408, the branding device transmits the networked computing device's principal identifier via the limited access network interface 222. Alternatively, for more complicated devices, especially devices which already have a security state, the networked computing device 220 has or generates its own public/private key pair at 406, and sends its public key to the branding device and in return receives its name at 408.

The branding device 210 then generates a branding certificate 215 (FIG. 2) at 410 that tells the networked computing device 220 to trust the branding device. The branding certificate also provides the networked computing device with the branding device's public key for use in checking certificates provided by other devices that claim to be authorized by the branding device.

The branding device 210 also generates any other certificates the device needs in order to interact on the network at 412. These include trust group membership certificate(s) 216 (FIG. 2) that identify the networked computing device to be a member of a trust group (e.g., groups 140-142 in FIG. 1). In a home network, for example, devices will probably be configured to only be willing to communicate with other devices that are members of the same group they are. Group membership is determined through a certificate that states that a device is a member of a particular group. If the certificate is signed by the branding device, whom everyone has been programmed to trust, then the group membership certificate will be considered valid and the communication will be allowed.

At 414, the networked computing device 220 receives and stores the trust set-up information conveyed via the limited access network interface 222 from the branding device 210 into a trust set-up store 232. At 416, the networked computing device 220 initializes its security resolver 228 with the branding device's branding certificate. The initialized security resolver 228 can then use the branding device's public key to authenticate certificates provided by other devices to the networked computing via the interface 224 to the open data network 110, and permit interaction with such devices that are properly validated as members of the networked computing device's trust group(s).

In some implementations of branding, many networked computing devices, especially of the consumer variety, may continue to implicitly trust communications over the limited access network interface. Imagine, for example, that the branding device 110 is lost. Unless the user backed up the branding device's public and private key and has the ability to restore them to a new branding device it will no longer be possible to add new devices to the network. Having to send the devices back to the factory to have their branding reset is not likely to be a very pleasant user experience. In such cases, it may be preferable to leave the limited access network interface trusted and to be willing to accept new branding information over that interface. Alternatively, the networked computing devices can be equipped with a branding reset button that can be activated to reset the devices to their initial unbranded state, in which the devices can be re-branded by another branding device.

In other branding implementations, networked computing devices (e.g., which have to exist in public or other unsecured venues) once branded, will most likely require the same level of verification through their limited access network interfaces as they do through their multi-access network interfaces. This will ensure that once the device has been branded no unauthorized modifications will be made to the device. This requires that the keys used to brand the devices be more carefully looked after but this is not an unreasonable expectation for a device which is expected to operate in a secure manner in an unsecured location.

Figure 5:
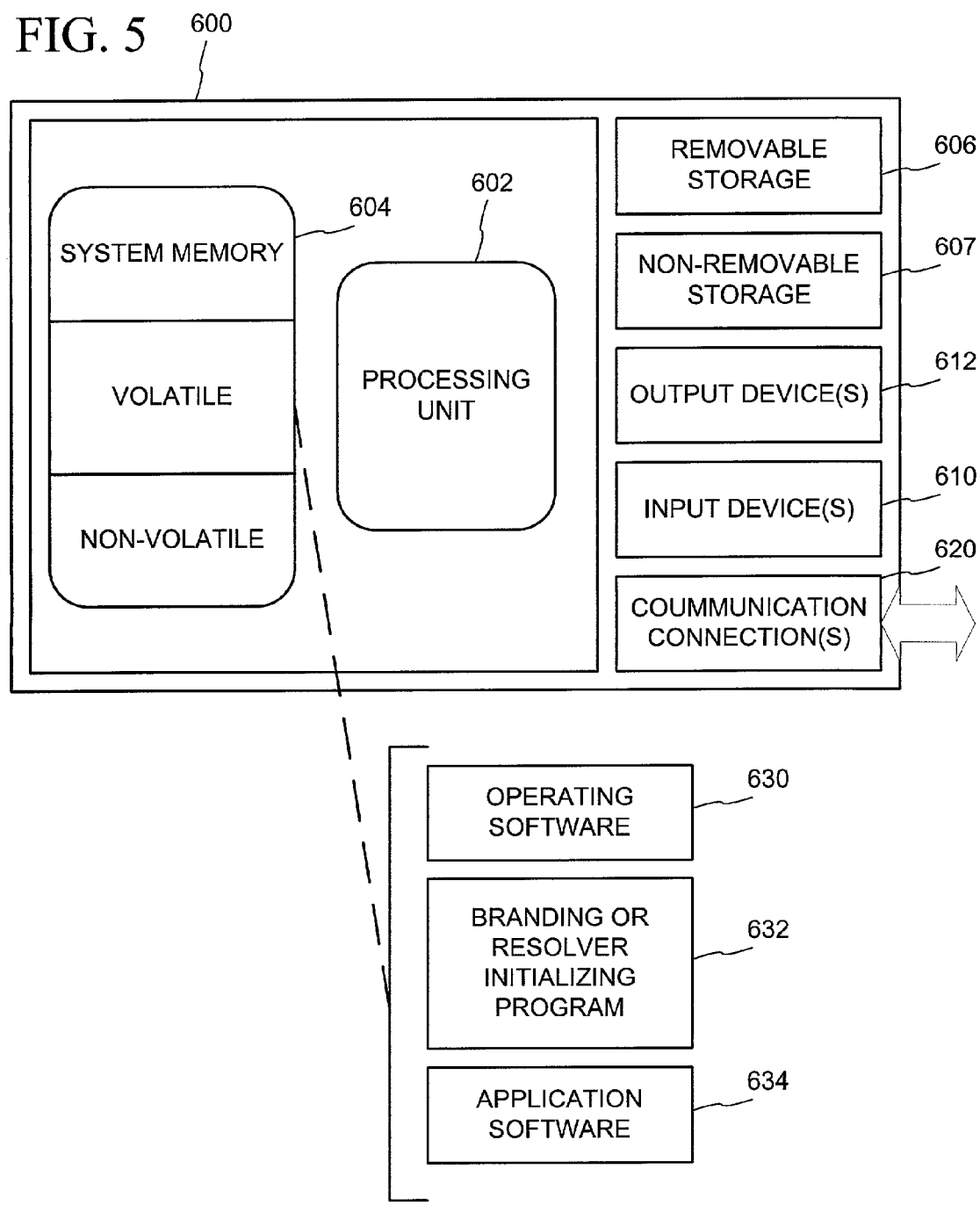
FIG. 5 is a block diagram of a computer system that may be used as the networked computing device or the branding device of FIG. 2.

With reference to FIG. 5, an exemplary device architecture 600 for the branding device 210 or networked computing device 220 (FIG. 2) typically is configured to include a processing unit 602 (e.g., a microprocessor or micro-controller) and system memory 604. Depending on the exact configuration and type of computing device, the system memory may be volatile (such as RAM), non-volatile (such as ROM, flash memory, etc.) or some combination of the two. Additionally, the computer 600 may also have mass or secondary storage (removable 606 and/or non-removable 607) such as magnetic or optical disks or tape. The storage typically stores operating and application software 630, 634, as well as branding or security initializer program implementing the branding process for the .respective branding or networked computing device. Similarly, the computer architecture 600 may also have input devices 610 such as a keyboard, pointing device, microphone, etc., and/or output devices 612 such as display, speaker, printer, force-feedback, etc. The computer architecture 600 also typically includes network connections 620 (such as the limited access network interface 222 and open data network interface 224 of FIG. 2) to other devices, computers, networks, servers, etc. using either wired or wireless media. Alternatively, the system components of the device may in fact be embodied in a distributed computing system. For example, a terminal device may incorporate input and output devices to present only the user interface, whereas processing component of the system are resident elsewhere. A phone may present web pages that are constructed on a remote server from data resident on a database server somewhere else again.

The computer architecture 600 typically includes at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Appendix A

Assertion Based Certificates (ABCs)

Introduction

The goal of Assertion Based Certificates (ABCs) is to create an authentication and encryption infrastructure that can operate both in the presence and absence of central authority.

ABCs provide for authentication, encryption and trust transfer. The later provides for trust webs that can be created without central administration or a centralized namespace.

While ABCs are based on public key technology provisions are made to allow for the retrieval of public/private key pairs through the use of passwords. While such a system is no more secure than a password based system the ability to retrieve a public/private key pair provides benefits in terms of the scalability of trust transfers and uniformity of security systems.

ABCs also provide for the creation and manipulation of groups of principals as well as k-of-n threshold groups.

Design

ABC exists to allow for the transfer of trust amongst principals. ABC's resolution system allows one to determine if trust is properly being transferred in order to allow an action. ABC's certificate format allows one to exactly express what trust is being transferred.

Resolution

In order to explain how ABC's resolution system the concept of an assertion is introduced. An assertion is a statement of the form Assertion(Issuer, Subject, Date, Delegate, Revoke). An assertion can be thought of as a logical predicate that is used to build up a model of the universe. When someone attempts to perform an action one creates a hypothesis that the person is allowed to perform the desired action and tests it against the model.

An assertion can be read "The issuer asserted ASSERTION about the subject at the date indicated."

If the delegate value is included then an additional statement is added "The issuer authorizes the subject to transfer the trust of the assertion onto other principals."

If the revoke value is included then assertion is a revocation. This means that the right is being taken away. Conflicts between an assertion and revocation are resolved based on the issuing date/time. The later date/time always wins.

In the general case revoke and delegate are mutually exclusive.

Principals

ABC sidesteps the issue of what a principal is and instead concentrates on how a principal is identified. In ABC a principal identifier is a universally unique identifier, usually a public key. The benefit of this arrangement is that it does not require any central administration of a principal namespace. By the very nature of encryption the names of all principals are now more or less guaranteed (modulo the odd cosmic ray) to be unique.

This relationship is backwards from most public key systems. In most systems a principal is identified by some sort of principal namespace and then a public key is associated with that principal identifier. This meant that some sort of central control was needed to make sure that principal identifiers didn't collide. In ABC no central control of any kind is required.

Groups

In a public key infrastructure one often wishes to group principals together in order to make statements about the group as a whole.

In ABC a group is a principal, identified and manipulated as any other principal. However the group related assertions are principal substitution trust transfer assertions. Thus one can take a single assertion that has a group as its subject and resolve it into an assertion with each group member as the subject.

Group principals are not members of themselves by default although they can be declared as such.

K-of-N Thresholds

There exist cases where one does not wish to transfer trust to a single principal acting on its own. Rather, one wishes to transfer trust for use by a group of principals acting in concert. For example, one would not want a single principal able to authorize the launching of a nuclear missile. One would much rather require that out of N authorized principals, at least K must agree before the launch could occur. This situation is referred to as a K-of-N threshold.

Like groups, K-of-N thresholds are principals. If a K-of-N threshold is listed as the issuer of a certificate than the certificate must be signed by at least K of the members of the K-of-N threshold for the certificate to be considered valid.

Resolver

A resolver has two jobs: (1) Collect together assertions, verify that the assertions were made by the stated issuers and that the assertions are valid; and (2) Evaluate security queries.

When a system wishes to determine if a certain action should be allowed it describes the action as a set of assertions and then performs a security query on the resolver to determine if those assertions all exist in the set of assertions maintained by the resolver. If the answer is yes, then the action is allowed.

When an assertion is validated by the resolver and entered into the resolver's database it may be possible using the operations below to create new assertions. The two mechanisms most commonly used to create new assertions are trust transfers and principal substitutions.

Validation

Validation is the process of determining if an assertion was actually made by the listed issuer. Before an assertion can be entered into the resolver's database it must be validated.

Public Key Principals

In the case that the issuer is a public key having the assertion signed by the issuer can validate the assertion.

Verification MUST be provided that the issuer's signature was used for the explicit purpose of validating the assertion.

For example, one could imagine a file system which, when asked for a file, returns the file signed by the file system administrator. Inside the file is a series of assertions that list the file system administrator as the issuer. It would be inappropriate to use the signature of the file as a means of validating the assertions contained within. This is especially true given that in this case the reason the file was signed was to prove that what the requestor received was what the file system sent.

This specification provides for the signedassert and unsignedassert elements to help address these issues. The signedassert element provides explicit confirmation that an assertion was signed for the purposes of verification. The unsignedassert XML element provides explicit confirmation that an assertion was not signed for the purposes of verification. In the case where both assertions are included the unsignedassert MUST always win.

Signatures may potentially be nested. In that case the signedassert/unsignedassert XML elements The purpose of the signature is only to prove that the contents were received in the form sent by the file system. It would thus be inappropriate to use the signature as a means to validate any assertions which may If the file should happen to contain an assertion which lists the file system administrator as the issue, it would clearly be inappropriate to Trust Transfer The trust transfer is the core of the ABC design. It allows trust to be passed along a chain that can then be followed back to the root, SELF. A trust transfer occurs between two assertions that have the following form:

|  | #1 | #2 |
|---|---|---|
| Assertion | A | A |
| Issuer | Principal 1 | Principal 2 |
| Subject | Principal 2 | Principal 3 |
| Date | Date1 | Date2 |
| Delegate | Yes | Value in #2 |
| Revoke | No | No |
| Other | Same | Same |

The two assertions are of the same type and the first one has delegate authority. Delegate authority is critical because it is what makes the trust transfer legal. That is, Principal 1 has given Principal 2 the right to pass the trust onto someone else. Obviously neither certificate can be a revocation since revocations are meant to end trust relationships, not create them. Finally, the assertion might include additional information. Unless the definition of the assertion states otherwise, the only requirement for performing a trust transfer is that the additional information for both assertions be identical.

The result of the trust transfer operation is the creation of a new assertion of the following form:

| Assertion | A |
|---|---|
| Issuer | Principal 1 |
| Subject | Principal 3 |
| Date | If(Date1 > Date2) then Date2 else Date1 |
| Delegate | Value in #2 |
| Revoke | No |
| Other | Same |

The new assertion states that principal 1 make assertion A about principal 3. Even though principal 1 never directly made this statement, it is valid to create the new assertion because of the trust transfer enabled by the delegate authority principal 1 gave to principal 2. The date of the new assertion will be the more recent of the two dates as this will indicate the most up to date information. The delegate value for the new assertion will depend on the value of the original certificate that transferred trust to principal 3.

Trust trains can be broken. If assertion #1 should ever be revoked then the entire trust train built on it would break as well and all trust transfer operations based on assertion #1 would have to be removed.

Principal Substitution

A principal substitution is a trust transfer that functions across different kinds of assertions. This document contains two principal substitution assertions, SELF and ALL.

|  | #1 | #2 |
|---|---|---|
| Assertion | SELF/ALL | A |
| Issuer | Principal 1 | Principal 2 |
| Subject | Principal 2 | Principal 3 |
| Date | Date1 | Date2 |
| Delegate | Irrelevant | Value in #2 |
| Revoke | No | No |
| Other | Same | Same |

The first assertion is either SELF or ALL. The second assertion can be anything. Although the meaning of the SELF and ALL assertions, as explained below, are different, the principal substitution mechanism works the same way for both. The subject of the principal substitution assertion can then be substituted for any other subject in any other assertion.

The result of the principal substitution trust transfer operation is the creation of a new assertion of the following form:

| | |
|---|---|
| Assertion | A |
| Issuer | Principal 1 |
| Subject | Principal 3 |
| Date | If (Date 1 > Date2) then Date2 else Date1 |
| Delegate | Value in #2 |
| Revoke | No |
| Other | Same |

Date Conflict

A date conflict occurs when two assertions are otherwise identical but for their issuing date. In this case the assertion with the more recent date wins. Note that the validation information for the assertions is not relevant to the existence and resolution of a date conflict. Thus even if the older assertion has tighter verification requirements if the newer assertion has been properly verified then it MUST replace the older assertion.

Revocation Conflict

A revocation conflict occurs when one assertion grants a right to a principal and another removes it.

The first step in the case of a conflict is to perform full resolution and ensure that both assertions can be reduced to having the issuer be SELF. This ensures that the assertions are relevant to the resolver and are not simply holding space in case a future assertion is made which can complete the trust chain back to self.

Once this reduction has occurred two assertions should remain:

| | #1 | #2 |
|---|---|---|
| Assertion | A | A |
| Issuer | SELF | SELF |
| Subject | Principal 2 | Principal 2 |
| Date | Date1 | Date2 |
| Delegate | Irrelevant | Not Present |
| Revoke | No | Yes |
| Other | Same | Same |

The winner of the conflict will be the assertion with the more recent date.

Delegation Conflict

It is possible for two assertions, once resolved to SELF, to have identical values for everything, including date, but not for delegate. In that case the assertion granting delegation rights SHOULD be favored.

Principal A's Principal B

One of the hardest problems in creating a public key infrastructure is the telephone book problem. If I look up "Jim Smith" in a telephone book there are likely to be an enormous number of people listed. While it is possible to use secondary information, such as the listed address, this information may not always be available and unless the contents of the telephone book have themselves been verified by a trusted third party it is always possible for someone to lie.

One of powerful observation is that while you may not know Jim Smith's public key, you do know your friend Michael's public key and you know that Michael knows Jim. Therefore what you wanted to do was to go to Michael's address book (available on-line, of course) and query it for the Jim Smith that your friend Michael knows. It is possible that your friend Michael also knows multiple Jim Smiths but in the average case the total number is small and it is expected that sufficient secondary data will be provided to allow for differentiation between them.

ABC supports this facility through the FXPP ignore rules. It is possible to add arbitrary information to an assertion which, if not understood, will be ignored. Thus one can add all sorts of properties, without worrying about corrupting the meaning of the assertions.

Principal XML Element

Name: principal

Namespace: ABC:

Purpose: Provides a principal name. Two naming schemes are currently supported. The first returns the entire public key. The second returns a collision free hash of the public key. The second is often preferred because it saves space and, as SPKI points out, in the case of small RSA keys it can protect those keys from cryptanalysis by keeping them secret. A privatekey XML element is only included for informational purposes. A principal can only be identified by its publickey or a hash of the public key.

<!ELEMENT principal ((publickey privatekey?) | keyhash | passprincipal) loc?>

Publickey XML Element

Name: publickey

Namespace: ABC:

Purpose: Contains a public key algorithm specific XML element that specifies a public key. Companion documents will define XML elements appropriate for expressing specific types of public keys.

<!ELEMENT publickey ANY>

Privatekey XML Element

Name: privatekey

Namespace: ABC:

Purpose: Contains a private key algorithm specific XML element that specifies a private key. Companion documents will define XML elements appropriate for expressing specific types of private keys.

<!ELEMENT privatekey ANY>

Keyhash XML Element

Name: keyhash

Namespace: ABC:

Purpose: Identifies that the hash element inside of this element is the hash of a public key. No keyhash is needed for a private key because private keys can not be used to identify principals.

<!ELEMENT keyhash hash>

Passprincipal XML Element

Name: passprincipal
Namespace: ABC:
Purpose: Identifies a principal using a name and password.
<!ELEMENT passprincipal name password>

Name XML Element

Name: name
Namespace: ABC:
Purpose: Provides the name part of a name/password pair.
<!ELEMENT name HREF?>

Password XML Element

Name: password
Namespace: ABC:
Purpose: provides the password part of a name/password pair. The password MUST be a string.
<!ELEMENT name #PCDATA>

Loc XML Element

Name: loc
Namespace: ABC:
Purpose: Provides location information regarding the principal. Locations are identified using URIs. Generally locations are used to retrieve up to date copies of the principal's public key.
<!ELEMENT loc href+>

Persisted Valid Assertions

As previously stated, a valid assertion is expressed as Assertion(Issuer, Subject, Date, Delegate, Revoke). The components of an assertion must be persisted in order to enable them to be transferred from one system to another. The persistence format for each of the components but the date is given below. The date will be discussed in the section on validation along with how to persist other validation information.

Issuer XML Element

Name: issuer
Namespace: ABC:
Purpose: Identifies the principal who is making an assertion.
<!ELEMENT issuer principal>

Subject XML Element

Name: subject
Namespace: ABC:
Purpose: Identifies the principal the assertion is about.
<!ELEMENT subject principal>

Deleg XML Element

Name: deleg
Namespace: ABC:
Purpose: deleg is placed inside of assertions to indicate if the subject has the right to delegate the assertion on to others. If a certificate does not contain a deleg element then the subject does not have delegation rights.
<!ELEMENT deleg EMPTY>

Revoke XML Element

Name: revoke
Namespace: ABC:
Purpose: revoke is placed inside of an assertion to indicate that it is a revocation.
<!ELEMENTE revoke EMPTY>

Validating Assertions

For an assertion to be accepted by a resolver it must first be verified. Three types of verification are currently supported by ABC: (1) Validating the Issuer—Prove the certificate was issued by the listed issuer; (2) Validating the Date—Check that the certificate is within its valid date range; and (3) Validating the On-Line Tests—Successfully verify at least one of the on-line tests.

Validating the Issuer

Before a resolver accepts an assertion it MUST first determine if the listed issuer made the assertion. The simplest proof is for the assertion to be signed by the issuer. It is also possible that information outside of ABC, such as transport level security, may provide sufficient proof for the resolver to accept that an assertion was made by the listed issuer.

Validating the Date

All assertions must have "not before" date/times. If the current date and time is less than the "not before" date/time then the assertion must be treated as false. This date is required because in order to resolve certain state conflicts which will be explained later.

All assertions should have "not after" date/times. If the current date and time is greater than the "not after" date/time then the assertion must be treated as false.

notbefore XML Element
Name: notbefore
Namespace: ABC:
Purpose: Specifies that the assertion MUST NOT be honored at a date/time less than the one listed. All assertions MUST have a "not before" date. An assertion without a "not before" date MUST be treated as false.
<!ELEMENT notbefore datetime> notafter XML Element
Name: notafter
Namespace: ABC:
Purpose: Specifies that the assertion MUST NOT be honored at a date/time greater than the one listed. All assertions SHOULD have a "not after" date.
<!ELEMENT notafter datetime> datetime XML Element
Name: datetime
Namespace: ABC:
Purpose: Provides a date and time.
Value: date-time.
<!ELEMENT datetime #PCDATA>

Validating the On-Line Tests

An on-line test is a test that requires that a communication occur with another system in order to determine the continuing validity of the assertion. An on-line test is the only way to determine if a principal's identity has been compromised or if an assertion has been revoked.

On-line tests can occur either before the assertion is to be added to the resolver for the first time or before each and every time the resolver is required to refer to the assertion in order to determine the result of a security query.

beforefirstuse XML Element
   Name: beforefirstuse
   Namespace: ABC:
   Purpose: Contains one or more tests at least one of which MUST be successfully executed before accepting the assertion into the resolver. An assertion with an empty beforefirstuse XML element MUST be failed. This rule is included so that if the FXPP ignore rules end up removing all the tests inside of the beforefirstuse XML element then the assertion will be failed.
   <!ELEMENT beforefirstuse ANY> everytime XML Element
   Name: everytime
   Namespace: ABC:
   Purpose: Contains one or more tests at least one of which MUST be successfully executed before using an assertion that the resolver has previously accepted to satisfy a security query. An assertion with an empty everytime XML element MUST be failed. This rule is included so that if the FXPP ignore rules end up removing all the tests inside of the everytime XML element then the assertion will be failed.
   <!ELEMENT everytime ANY>

Group Assertions

Group Assertion

Notation
   In order to create a group one uses the GROUP assertion which has the logical form GROUP(Issuer, Subject, Date, Revoke).
   The principal identifier of the group is listed in the subject.
   The issuer is the one who is asserting that the subject is a group. The issuer and subject may be the same.
   Delegation MUST NOT be used with the GROUP assertion.
   Revoke is used to specify that the subject is not a group. Generally a group revocation is used when it is time to remove a group from service.

Resolution
   The GROUP assertion is much like the SELF assertion in that it types a principal. The GROUP assertion can then be used to confirm that other group assertions are really about groups.

Group XML Element
   Name: GROUP
   Namespace: ABC:
   Purpose: An assertion by the issuer that the subject identifies a new principal that represents a group.
   <!ELEMENT GROUP issuer subject notbefore notafter? beforefirstuse? everytime? revoke?>

Makemember Assertion

Notation
   The MAKEMEMBER assertion takes the form MAKEMEMBER(Issuer, Subject, Date, Delegate, Revoke, Group). In a MAKEMEMBER assertion the issuer asserts that the subject has the right to add members to the listed group. By issuing a MAKEMEMBER assertion the issuer also makes an implicit GROUP assertion that the listed group is in fact a group.

Resolution
   After the resolver has validated a MAKEMEMBER(Issuer1, Subject1, Date1, Delegate1, Revoke1, Group1) assertion two assertions should be entered database. The first is the MAKEMEMBER assertion. The second is a GROUP assertion of the form GROUP(Issuer1, Group1, Date1). Note that regardless if MAKEMEMBER is a revocation or not the implied GROUP assertion will always be a non-revocation assertion.
   Whenever a non-revocation GROUPMEMBER assertion is made it is necessary that a valid MAKEMEMBER assertion be available which provides proper authority for the issuer of the GROUPMEMBER assertion to make that assertion.

makemember XML Element
   Name: makemember
   Namespace: ABC:
   Purpose: The issuer asserts that the subject has the right to add members to the listed group.
   <!ELEMENT makemember issuer subject (deleg | revoke)? notbefore notafter? beforefirstuse? everytime? groupname> group XML Element
   Name: groupname
   Namespace: ABC:
   Purpose: Identifies the group an assertion is referring to.
   <!ELEMENT groupname principal>

Removemember Assertion

Notation
   The REMOVEMEMBER assertion takes the form REMOVEMEMBER(Issuer, Subject, Date, Delegate, Revoke, Group). In a REMOVEMEMBER assertion the issuer asserts that the subject has the right to remove members from the listed group. By issuing a REMOVEMEMBER assertion the issuer also makes an implicit GROUP assertion that the listed group is in fact a group.

Resolution
   After the resolver has validated a REMOVEMEMBER (Issuer1, Subject1, Date!, Delegate1, Revoke1, Group1) assertion two assertions should be entered into the assertion database. The first is the REMOVEMEMBER assertion. The second is a GROUP assertion of the form GROUP(Issuer1, Group1, Date1). Note that regardless if REMOVEMEMBER is a revocation or not the implied GROUP assertion will always be a non-revocation assertion.
   Whenever a revocation GROUPMEMBER assertion is made it is necessary that a valid REMOVEMEMBER assertion be available which provides proper authority for the issuer of the GROUPMEMBER assertion to make that assertion.

removemember XML Element
    Name: removemember
    Namespace: ABC:
    Purpose: The issuer asserts that the subject has the right to remove members from the listed group.
        <!ELEMENT removemember issuer subject (deleg | revoke)? notbefore notafter? beforefirstuse? everytime? groupname>

Groupmember Assertion

Notation

The GROUPMEMBER assertion is used to specify that a principal is a member of a particular group. Its logical form is GROUPMEMBER(Issuer, Subject, Date, Delegate, Revoke, Group).

In a GROUPMEMBER assertion the issuer is stating that the subject is a member of the listed group.

If the assertion includes delegation authority then the subject is authorized to add other people to the group. In other words, delegation authority creates an implicit MAKEMEMBER assertion.

If the assertion includes a revoke then the assertion states that the subject is not a member of the listed group.

Resolution

A GROUPMEMBER assertion is actually a combination of MAKEMEMBER and GROUPMEMBER. That is, for a GROUPMEMBER assertion to succeed the Issuer has to have the right to add members to the group.

In the case of a revoke GROUPMEMBER assertion the assertion decomposes into a the GROUPMEMBER assertion and the REMOVEMEMBER assertion.

groupmember XML Element
    Name: groupmember
    Namespace: ABC:
    Purpose: Identifies that the list of members for this group is incomplete.
        <!ELEMENT GROUP issuer subject notbefore notafter? beforefirstuse? everytime? (delegate | revoke)? groupname>

K-of-N Threshold Principal kofn XML Element
    Name: kofn
    Namespace: ABC:
    Purpose: To declare that the group is a K-of-N threshold. Kval MUST be less than or equal to the number of principal elements. If Kval is greater than the number of principal elements then the certificate MUST be treated as invalid.
        <!ELEMENT kofn kval> kval XML Element
    Name: kval
    Namespace: ABC:
    Purpose: An integer indicating how many of the listed principals must agree for an assertion to hold.
    Value: Number
    Number=Integer | (Int-No-Zero Integer*)
    Int-No-Zero="1"|"2"|"3"|"4"|"5"|"6"|"7"|"8"|"9"
    Integer="0"|Int-No-Zero
        <!ELEMENT #PCDATA>

Self Assertion

When a resolver is first started it must be bootstrapped, told who it is. The self assertion can be used to this end, to tell a resolver who it is. A resolver may have multiple identities. Note that there is no requirement that resolvers be bootstrapped using a self assertion. A resolver can certainly generate its own identity and use appropriate mechanisms to inform others of that identity.

Notation

The notation used by ABC to represent the self assertion is SELF(Issuer, Subject, Date/Time, Delegate, Revoke).

The subject is the principal identifier for the resolver.

In cases where the device is starting with absolutely no initial state the Issuer may be the same as the Subject. In other cases an authorized principal may be the issuer.

The date/time stamp indicates when the self assertion goes into effect.

Delegate authority is handled normally and controls if the resolver is allowed to assign the identity to others.

A revoke self assertion is read as meaning that the resolver MUST NOT take on the listed identity. As usual with revocations, in the case of a conflict between an assertion and revocation the one with the later date/time wins.

Resolution

The self assertion is used for substitutions. It lets the resolver know that any issuers or subjects who are the same as the subject of a self assertion identify the system the resolver is responsible for.

Self XML Element

Name: self
    Namespace: ABC:
    Purpose: Asserts that the subject identifies the system the resolver is responsible for.
        <!ELEMENT self issuer subject (deleg | revoke)? notbefore notafter? beforefirstuse? everytime?>

ALL Assertion

Notation

The notation used by ABC to represent the ALL assertion is ALL(Issuer, Subject, Date/Time, Delegate, Revoke).

In the ALL assertion the issuer asserts that the subject has all the rights of the issuer.

Resolution

The ALL assertion is a principal substitution trust transfer assertion.

ALL XML Element

Name: all

Namespace: ABC:

Purpose: Indicates that subject has all the rights of the issuer.

<!ELEMENT all issuer subject (deleg | revoke)? notbefore notafter? beforefirstuse? everytime?> signedassert XML Element

Name: signedassert

Namespace: ABC:

Purpose: It is included with an assertion that has been signed by the issuer. The element is needed in order to establish a semantic relationship between the signature and what is being signed.

<!ELEMENT signedassert EMPTY>

FXPP and ABC

Talk about the subtleties of the ignore rule.

ABC Compliance

CSPKI compliant systems MUST support the Flexible XML Processing Profile [FXPP] and MUST understand all XML elements defined in this specification.

hash XML Element

Name: hash

Namespace: ABC:

Purpose: A hash contains an element that specifies the actual hash and potentially a list of URIs indicating where the object being hashed can be found.

<!ELEMENT hash href*>

Signature XML Element

Name: signature

Namespace: ABC:

Purpose: The signature XML element is used to specify that the contents are a signature. The mechanism for expressing the signature is algorithm specific and is not specified here. ABC only specifies what is being signed, in this case, the value XML element.

<!ELEMENT signature value>

Value XML Element

Name: value

Namespace: ABC:

Purpose: The value XML element includes what is being signed. Because the signature information itself is content it must be signed. Thus identification information such as the principal who is doing the signing.

The optional principal element is used to indicate who is doing the signing. The element is optional because some signature formats may already contain principal identification information. A href XML element may also be included in order to indicate where the material being signed.

<!ELEMENT value principal? href* signedassert?> keytransfer XML Element

Name: keytransfer

Namespace: ABC:

Purpose: To transfer a session key that has been encrypted with a principal's public key. The principal XML element identifies the principal whose public key was used to encrypt the session key. A second algorithm specific element carries the encrypted session key. If the content being encrypted is not known from context then one or more href elements may be included to indicate what has been encrypted.

<!ELEMENT keytransfer principal href*>

EXAMPLE 1

CD and Speakers

Introduction

A CD player and speakers have both been connected to a broadcast type network such as wireless or power line network. Anyone who is within the broadcast area has the ability to communicate with both the CD and Speakers. That means that anyone, anywhere can use the CD or Speakers.

To protect against unauthorized access both devices will only accept commands over the broadcast medium if they have been signed and/or encrypted by a trusted principal.

The process of establishing trust is referred to as "branding." Both devices would be enhanced with a non-broadcast networking type like USB or a limited broadcast networking type like infrared. The devices will accept unsigned/unencrypted commands through the limited networking connection. This will let the device be branded in a more secure manner.

One can imagine, for example, a hand held device such as a WinCE machine which uses an infrared transmitter or a USB connection to attach to the CD and Speakers. There are two types of basic branding.

In the example below the branding device uses the limited networking interface to provide a principal identifier containing both a public and a private key. This will be the keys that the CD uses to identify itself. The branding device will then transmit a certificate that says that the CD player trusts the branding device. This certificate is used to initialize the device's resolver, it also provides the CD with the branding device's public key for use in checking certs provided by other devices who claim to be authorized by the branding device. Finally, the branding device will send the CD a signed certificate that asserts that the CD is a member of a group that is trusted by the branding device. The CD will now be willing to communicate with anyone else who can prove they are also a member of the group.

Providing the CD with its Public/Private Key Pair

This is the principal generated by the branding device for the CD. The principal identifier does not need to be included in a certificate because the CD implicitly trusts any communication of its "trust" line.

```
<x:principal xmlns:x="ABC:">
    <publickey>
        <x:pubrsapkcs1>
            <x:rsae>1234</x:rsae>
            <x:rsan>1234</x:rsan>
        </xpubrsapkcs1>
    </x:publickey>
    <x:privatekey>
        <x:privatersapkcs1>
            <x:rsae>1234</x:rsae>
            <x:rsan>1234</x:rsan>
            <x:rsad>1234</x:rsad>
            <x:rsap>1234</x:rsap>
            <x:rsaq>1234</x:rsaq>
            <x:rsaa>1234</x:rsaa>
            <x:rsab>1234</x:rsab>
            <x:rsac>1234</x:rsac>
        </x:privatersapkcs1>
    </x:privatekey>
</x:principal>
```

Providing the CD with a Certificate that Makes it Trust the Branding Device

This is the certificate that states that the CD trusts the branding device. It is given to the CD by the branding device. This certificate will be included by the CD in its certification reduction database. Again, the CD trusts this certificate because it was transmitted over the trusted line.

```
<x:cert xmlns:x="ABC:">
    <issuer><principal><publickey><keyhash><hash>
        <md5>Hash of CD Player's Pub Key</md5>
    </hash></keyhash></publickey></principal></issuer>
    <subject><principal><publickey><x:pubrsapkcs1>
        <x:rsae>2345</x:rsae>
        <x:rsan>2345</x:rsan>
    </x:pubrsapkcs1></publickey></principal></subject>
    <tag>
        <allpermissions/>
    </tag>
</x:cert>
```

Providing the CD with a Signed Certificate which Proves the CD is a Member of a Group This next certificate, issued by the branding device, asserts that the CD is a member of the named group. This certificate is signed because the CD will need to present it to other devices in order to prove that it is authorized to speak with them.

```
<x:signature xmlns:x="ABC:">
    <hash>
        <md5>Hash of the certificate inside the value element</md5>
    </hash>
    <principal><publickey><keyhash><hash>
        <md5>Hash of Branding Device's Pub Key</md5>
    </hash></keyhash></publickey></principal>
    <sigrsapkcs1md5>This is a digital signature</sigrsapkcs1md5>
    <value>
        <cert>
            <issuer><principal><publickey><keyhash><hash>
                <md5>Hash of Branding Device's Pub Key</md5>
            </hash></keyhash></publickey></principal></issuer>
            <subject><principal><publickey><keyhash><hash>
                <md5>Hash of CD Player's Pub Key </md5>
            </hash></keyhash></publickey></principal></subject>
            <tag>
            <groupmem><principal><publickey><keyhash><hash>
                <md5>Hash of Group's Public Key</md5>
            </hash></keyhash></publickey></principal></groupmem>
            </tag>
        </cert>
    </value>
</x:signature>
```

Note that the CD doesn't actually know the real public key of the group it is a member of. This group probably doesn't even have a private key associated with it. More likely than not the branding device generated a public/private key pair, threw away the private key and used the public key as the group name.

Wrap-Up

The same process as specified previously is then repeated with the speakers.

When the time comes for the CD to talk directly to the speaker a key exchange happens. The CD sends over its public key and the group membership certificate. The speaker does the same. Both devices are thus able to see that they are members of the same group as certified by the branding device that they have both been instructed to trust. As such the two devices will be willing to communicate with each other.

EXAMPLE 2

Certificate Revocation

In the section "Providing the CD with a signed certificate which proves the CD is a member of a group" above, a signed certificate was presented where the branding device certified that the CD was a member of the local group. However the owner of the CD player is letting his friend borrow the CD player and so no longer wishes the CD player to have access to his private network. So the branding device issues a revocation. A revocation is identical to a certificate, except it says that something is not true rather than something is true.

```
<x:signature xmlns:x="ABC:">
    <hash>
        <md5>Hash of the certificate inside the value element</md5>
    </hash>
    <principal><publickey><keyhash><hash>
        <md5>Hash of Branding Device's Pub Key</md5>
    </hash></keyhash></publickey></principal>
    <sigrsapkcs1md5>This is a digital signature</sigrsapkcs1md5>
    <value>
        <cert>
            <issuer><principal><publickey><keyhash><hash>
                <md5>Hash of Branding Device's Pub Key</md5>
            </hash></keyhash></publickey ></principal></issuer>
```

-continued

```
    <subject><principal><publickey><keyhash><hash>
            <md5>Hash of CD Player's Pub Key</md5>
    </hash></keyhash></publickey></principal></subject>
        <negtag>
<groupmem><principal><publickey><keyhash><hash>
            <md5>Hash of Group's Public Key</md5>
    </hash></keyhash></publickey></principal></groupmem>
        </negtag>
      </cert>
   </value>
</x:signature>
```

The only thing different about this certificate from the original is that this certificate uses the negtag XML element instead of the tag XML element.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

As previously, it will also be recognized that the branding process of the invention can be implemented using other digital certificate techniques than the Assertion-Based Certificates, such as using X.509 digital certificates and other digital certificate standards or systems. Also, the branding process can use cryptographic techniques other than digital certificates to securely imprint the networked computing device with its trust group setup and provide secure interaction among trust group members.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

I claim:

1. A branding process to establish cryptographically secured interaction among networked computing devices within a trust group, the trust group comprising a group of devices, on an open multi-access network, comprising:
   securely networking a security-uninitialized device with a branding device via a secured network medium;
   generating a branding certificate at the branding device, the branding certificate instructing that the security-uninitialized device trust the branding device, the branding certificate further containing key data for verifying certificates provided by other devices on the open multi-access network to the security-uninitialized device are authenticated by the branding device;
   transmitting the branding certificate from the branding device to the security-uninitialized device via the secured network medium;
   generating a trust group membership certificate at the branding device which is signed by the branding device, the trust group membership certificate containing a signed group name as well as a signed key identifying the security-uninitialized device such that, when the security-uninitialized device sends the trust group certificate to a branded device which is a member of the trust group, the trust group certificate is validated by the branded device, and the branded device verifies that the security-uninitialized device identified in the trust group membership certificate is a member of the trust group of devices referred to by the group name;
   transmitting the trust group membership certificate from the branding device to the security-uninitialized device via the secured network medium; and
   initializing a security resolver of the security-uninitialized device to use the key data of the branding certificate to authenticate other devices interacting with the security-uninitialized device on the open multi-access network are in the trust group, and to provide the trust group membership certificate to such other devices as authentication that the security-uninitialized device is a member of the trust group, such that at least some interaction via the open multi-access network with the security-uninitialized device is cryptographically secured to only other devices in the trust group.

2. The branding process of claim 1 wherein securely networking the security-uninitialized and branding devices comprises networking the devices via a limited access network interface of the security-uninitialized device that is separate from the security-uninitialized device's interface to the open multi-access network.

3. The branding process of claim 2 wherein the limited access network interface is of a direct device-to-device wired networking medium.

4. The branding process of claim 2 wherein the limited access network interface is of a directional wireless networking medium.

5. The branding process of claim 1 wherein securely networking the security-uninitialized and branding devices comprises:
   placing transmitter/receivers of the security-uninitialized and branding devices for an omni-directional wireless networking medium into a wave guide and/or Faraday cage; and
   networking the devices with the wave guide and/or Faraday cage via the omni-directional wireless networking medium.

6. The branding process of claim 1 further comprising:
   transmitting a principal identifier from the branding device to the security-uninitialized device, the principal identifier providing a cryptographically secured identity to the security-uninitialized device, the principal identifier containing a public/private key pair; and
   using the public/private key pair to encrypt interaction of the security-uninitialized device with said other devices authenticated to be in the trust group.

7. The branding process of claim 6 wherein the principal identifier further contains a name for the security-uninitialized device, the process further comprising identifying the security-uninitialized device to human operators using the name.

8. The branding process of claim 7 further comprising prompting a human user of the branding device to enter the name upon performing the branding process on the security-uninitialized device.

9. The branding process of claim 1 further comprising initially distributing the security-uninitialized device in a retail channel prior to having the branding process performed on the security-uninitialized device.

10. The branding process of claim 9 further comprising upon completion of initializing the security resolver, disallowing the security-uninitialized device from having the branding process again performed on the security-uninitialized device until the now initialized security of the security-unitialized device is reset.

11. The branding process of claim 9 further comprising upon completion of initializing the security resolver, allowing the branding process to be performed only via a limited access network interface of the security-uninitialized device.

12. A networked computing device supporting branding to establish cryptographically secured interaction with other devices within a trust group of devices on an open-access network, the networked computing device comprising:
   a network interface for communicating on the open-access network;
   a security initializer operational to receive a branding certificate from a branding device securely networked to the networked computing device, the branding device having previously generated the branding certificate and trust group membership certificates, the security initializer further operational to initialize security resolvers with the branding certificate, wherein the branding certificate comprises branding key data for verifying certificates provided by other devices within the trust group on the open-access network; and
   a security resolver operational, after being initialized with the branding public key to authenticate trust group membership certificates separate from the branding certificate provided to the networked computing device from other devices via the network interface using the branding key data and to verify that the other devices providing trust group membership certificates are members of the trust group of devices, and further operational to inhibit interaction via the network interface with other devices not authenticated as in the trust group of devices, the security resolver being initially uninitialized;
   wherein each trust group membership certificate received after the security resolver is initialized is sent by an other device and each trust group membership certificates comprises:
      a signed name for a trust group; and
      a signed identifier for the other device sending the trust group membership certificate.

13. The networked computing device of claim 12 further comprising:
   a limited access networking interface; and
   wherein the security initializer further is operational to accept the branding public key when received from the branding device only via the limited access networking interface.

14. The networked computing device of claim 12 wherein:
   the security initializer further is operational to accept the branding public key when received from the branding device via the network interface when in an initial unbranded state; and
   the device further comprises a branding reset operational upon activation to return the security initializer to the initial unbranded state.

15. The networked computing device of claim 12 further comprising:
   a branding mode activator operational to place the networked computing device in a branding mode; and
   wherein the security initializer further operational to accept the branding public key when received from the branding device via the network interface when in the branding mode.

16. The networked computing device of claim 12 wherein:
   the security resolver is further operational when initialized with a trust group membership certificate to provide the trust group membership certificate to other devices via the network interface to attest to membership of the networked computing in the trust group; and
   the security initializer is further operational to receive the trust group membership certificate from the branding device while securely networked to the networked computing device, and further operational to initialize the security resolver with the trust group membership certificate.

17. The networked computing device of claim 12 wherein:
   the security resolver is further operational when initialized with a public/private key pair to encrypt interaction via the network interface with other devices authenticated as in the trust group using the public/private key pair; and
   the security initializer is further operational to receive the public/private key pair from the branding device while securely networked to the networked computing device, and further operational to initialize the security resolver with the public/private key pair.

18. The networked computing device of claim 12, wherein:
   the security resolver is configured to authenticate trust group membership certificates by:
      authenticating, from the trust group membership certificate, the signed name for the trust group and the signed identifier for the other device sending the trust group membership certificate using the branding public key; and
      when the signed name for a trust group matches the trust group, verifying that the other device sending the trust group membership certificate is a member of the trust group.

19. One or more computer-readable storage media containing instructions which, when executed on a computer, cause the computer to perform a branding process to establish cryptographically secured interaction among networked computing devices within a trust group, the trust group comprising a group of devices, on an open multi-access network, the branding process comprising:
   securely networking a security-uninitialized device with a branding device via a secured network medium;
   generating a branding certificate at the branding device, the branding certificate instructing that the security-uninitialized device trust the branding device, the branding certificate further containing key data for verifying certificates provided by other devices on the open multi-access network to the security-uninitialized device are authenticated by the branding device;
   transmitting the branding certificate from the branding device to the security-uninitialized device via the secured network medium;
   generating a trust group membership certificate at the branding device which is signed by the branding device, the trust group membership certificate containing a signed group name as well as a signed key identifying the security-uninitialized device such that, when the security-uninitialized device sends the trust group certificate to a branded device which is a member of the trust group, the trust group certificate is validated by the branded device, and the branded device verifies that the security-uninitialized device identified in the trust group membership certificate is a member of the trust group of devices referred to by the group name;

transmitting the trust group membership certificate from the branding device to the security-uninitialized device via the secured network medium; and initializing a security resolver of the security-uninitialized device to use the key data of the branding certificate to authenticate other devices interacting with the security-uninitialized device on the open multi-access network are in the trust group, and to provide the trust group membership certificate to such other devices as authentication that the security-uninitialized device is a member of the trust group, such that at least some interaction via the open multi-access network with the security-uninitialized device is cryptographically secured to only other devices in the trust group.

* * * * *